United States Patent
Yoshimi

(10) Patent No.: US 11,858,133 B2
(45) Date of Patent: Jan. 2, 2024

(54) ARTICULATED ROBOT SYSTEM, AND DRIVING METHOD AND CONTROL APPARATUS FOR ARTICULATE ARM THEREOF

(71) Applicant: DENSO WAVE INCORPORATED, Aichi-pref. (JP)

(72) Inventor: Atsuko Yoshimi, Chita-gun (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 247 days.

(21) Appl. No.: 16/823,597

(22) Filed: Mar. 19, 2020

(65) Prior Publication Data

US 2020/0298396 A1    Sep. 24, 2020

(30) Foreign Application Priority Data

Mar. 20, 2019   (JP) ................. 2019-052850

(51) Int. Cl.
| | |
|---|---|
| *B25J 9/06* | (2006.01) |
| *B25J 9/12* | (2006.01) |
| *B25J 9/16* | (2006.01) |
| *B25J 9/00* | (2006.01) |

(52) U.S. Cl.
CPC ............. *B25J 9/06* (2013.01); *B25J 9/0009* (2013.01); *B25J 9/12* (2013.01); *B25J 9/1638* (2013.01)

(58) Field of Classification Search
CPC ..... B25J 9/10; B25J 9/12; B25J 9/1638; B25J 13/08; B25J 19/02; B25J 9/163
See application file for complete search history.

(56) References Cited

U.S. PATENT DOCUMENTS

| | | | | |
|---|---|---|---|---|
| 10,144,125 | B2 * | 12/2018 | Su ...................... | B25J 13/081 |
| 2015/0290809 | A1 * | 10/2015 | Nakagawa ............ | B25J 13/085 700/258 |
| 2017/0312917 | A1 * | 11/2017 | Chung ................. | G05B 19/423 |
| 2018/0043525 | A1 * | 2/2018 | Su ...................... | G05B 19/425 |
| 2018/0311814 | A1 | 11/2018 | Kamisono et al. | |
| 2019/0015972 | A1 * | 1/2019 | Someya .............. | B25J 9/0081 |
| 2019/0099898 | A1 * | 4/2019 | Sato ................... | B25J 15/0683 |
| 2019/0160662 | A1 * | 5/2019 | Satou .................. | G05B 19/423 |

FOREIGN PATENT DOCUMENTS

| | | | |
|---|---|---|---|
| CN | 103425100 A | * | 12/2013 |
| JP | 05-265638 | * | 10/1993 |
| JP | H11-077580 A | | 3/1999 |
| JP | 2011-212837 A | | 10/2011 |
| JP | 2014-128843 A | | 7/2014 |
| KR | 100907906 | * | 7/2009 |

\* cited by examiner

*Primary Examiner* — William C Joyce
(74) *Attorney, Agent, or Firm* — Oliff PLC

(57) ABSTRACT

In a robot system provided with an articulated arm, information showing whether or not an operator holds one or more of a plurality of arms of the articulated arm. An operator's holding state of the arms are determined based on the detected information. Based on results of the determination, the rotation of motors provided at axes (joints) is controlled for selectively controlling a constrained state which constrains the rotation of the axes and release of the constrained state.

14 Claims, 16 Drawing Sheets

FIG.3

| ARM 1 | ARM 2 | FIRST AXIS | SECOND AXIS | THIRD AXIS | FOURTH AXIS | FIFTH AXIS | SIXTH AXIS |
|---|---|---|---|---|---|---|---|
| — | — | × | × | × | × | × | × |
| FIRST DETECTION UNIT | — | ○ | × | × | × | × | × |
| SECOND DETECTION UNIT | — | ○ | ○ | × | × | × | × |
| THIRD DETECTION UNIT | — | ○ | ○ | ○ | × | × | × |
| FOURTH DETECTION UNIT | — | ○ | ○ | ○ | ○ | × | × |
| FIFTH DETECTION UNIT | — | ○ | ○ | ○ | ○ | ○ | × |
| SIXTH DETECTION UNIT | — | ○ | ○ | ○ | ○ | ○ | ○ |
| FIRST DETECTION UNIT | SECOND DETECTION UNIT | × | ○ | × | × | × | × |
| | THIRD DETECTION UNIT | × | ○ | ○ | × | × | × |
| | FOURTH DETECTION UNIT | × | ○ | ○ | ○ | × | × |
| | FIFTH DETECTION UNIT | × | ○ | ○ | ○ | ○ | × |
| | SIXTH DETECTION UNIT | × | ○ | ○ | ○ | ○ | ○ |
| SECOND DETECTION UNIT | THIRD DETECTION UNIT | × | × | ○ | × | × | × |
| | FOURTH DETECTION UNIT | × | × | ○ | ○ | × | × |
| | FIFTH DETECTION UNIT | × | × | ○ | ○ | ○ | × |
| | SIXTH DETECTION UNIT | × | × | ○ | ○ | ○ | ○ |
| THIRD DETECTION UNIT | FOURTH DETECTION UNIT | × | × | × | ○ | × | × |
| | FIFTH DETECTION UNIT | × | × | × | ○ | ○ | × |
| | SIXTH DETECTION UNIT | × | × | × | ○ | ○ | ○ |
| FOURTH DETECTION UNIT | FIFTH DETECTION UNIT | × | × | × | × | ○ | × |
| | SIXTH DETECTION UNIT | × | × | × | × | ○ | ○ |
| FIFTH DETECTION UNIT | SIXTH DETECTION UNIT | × | × | × | × | × | ○ |

— : NOT DETECTED, ○ : RELEASED (GRAVITY CORRECTION), × : CONSTRAINED (BRAKING)

FIG.16

| ARM 1 | ARM 2 | FIRST AXIS | SECOND AXIS | THIRD AXIS | FOURTH AXIS | FIFTH AXIS | SIXTH AXIS |
|---|---|---|---|---|---|---|---|
| BASE DETECTION UNIT FIRST TO SIXTH DETECTION UNITS | — | × | × | × | × | × | × |
| BASE DETECTION UNIT | FIRST DETECTION UNIT | ○ | × | × | × | × | × |
| BASE DETECTION UNIT | SECOND DETECTION UNIT | ○ | ○ | × | × | × | × |
| BASE DETECTION UNIT | THIRD DETECTION UNIT | ○ | ○ | ○ | × | × | × |
| BASE DETECTION UNIT | FOURTH DETECTION UNIT | ○ | ○ | ○ | ○ | × | × |
| BASE DETECTION UNIT | FIFTH DETECTION UNIT | ○ | ○ | ○ | ○ | ○ | × |
| BASE DETECTION UNIT | SIXTH DETECTION UNIT | ○ | ○ | ○ | ○ | ○ | ○ |
| FIRST DETECTION UNIT | SECOND DETECTION UNIT | × | ○ | × | × | × | × |
| FIRST DETECTION UNIT | THIRD DETECTION UNIT | × | ○ | ○ | × | × | × |
| FIRST DETECTION UNIT | FOURTH DETECTION UNIT | × | ○ | ○ | ○ | × | × |
| FIRST DETECTION UNIT | FIFTH DETECTION UNIT | × | ○ | ○ | ○ | ○ | × |
| FIRST DETECTION UNIT | SIXTH DETECTION UNIT | × | ○ | ○ | ○ | ○ | ○ |
| SECOND DETECTION UNIT | THIRD DETECTION UNIT | × | × | ○ | × | × | × |
| SECOND DETECTION UNIT | FOURTH DETECTION UNIT | × | × | ○ | ○ | × | × |
| SECOND DETECTION UNIT | FIFTH DETECTION UNIT | × | × | ○ | ○ | ○ | × |
| SECOND DETECTION UNIT | SIXTH DETECTION UNIT | × | × | ○ | ○ | ○ | ○ |
| THIRD DETECTION UNIT | FOURTH DETECTION UNIT | × | × | × | ○ | × | × |
| THIRD DETECTION UNIT | FIFTH DETECTION UNIT | × | × | × | ○ | ○ | × |
| THIRD DETECTION UNIT | SIXTH DETECTION UNIT | × | × | × | ○ | ○ | ○ |
| FOURTH DETECTION UNIT | FIFTH DETECTION UNIT | × | × | × | × | ○ | × |
| FOURTH DETECTION UNIT | SIXTH DETECTION UNIT | × | × | × | × | ○ | ○ |
| FIFTH DETECTION UNIT | SIXTH DETECTION UNIT | × | × | × | × | × | ○ |

— : NOT DETECTED, ○ : RELEASED (GRAVITY CORRECTION), × : CONSTRAINED (BRAKING)

ARTICULATED ROBOT SYSTEM, AND DRIVING METHOD AND CONTROL APPARATUS FOR ARTICULATE ARM THEREOF

CROSS-REFERENCE TO RELATED APPLICATION

This application is based on and claims the benefit of priority from earlier Japanese Patent Application No. 2019-052850 filed Mar. 20, 2019, the description of which is incorporated herein by reference.

BACKGROUND

Technical Filed

The present disclosure relates to an articulated robot system, and a driving method and a control apparatus for an articulated arm thereof, and in particular, to a vertical type or horizontal type of articulated robot system, and a driving method and a control apparatus for an articulated arm thereof.

Related Art

Articulated robots, when not in motion, i.e. when stationary, may be under braking to constrain motions of the axes and to thereby prevent unexpected motions of the axes. This braking may be mechanically applied or may be electrically applied by, for example, controlling the motors. In this configuration, for example, when an arm of the robot is moved by the user directly touching the robot such as in direct teaching, the user may have to operate a button provided to the robot or to the teaching pendant to release the constraints of the axes.

In this case, if the constraints of all the axes are released by the button operation, some axes, which the user (or operator) does not desire to move, may unexpectedly move. Therefore, in the robot systems of the conventional art, for example, all the axes are released only while the button provided to the robot or to the teaching pendant is pressed, or the axis corresponding to the button is released only while the button is pressed. However, in this configuration, the user has to press and hold the button with at least one hand to retain release of the constraints of the axes. This is inconvenient because the user has to manipulate the robot with the other hand only.

Furthermore, in some conventional robot systems, for example, the user can operate the teaching pendant or the like to select an axis to be manipulated or set constraint conditions of axes. However, in this configuration, the user may be involved in many time-consuming tasks, such as selection of an axis or setting of constraint conditions. In addition, when changing selection of an axis or setting of constraint conditions, the user is required to temporarily stop manipulation of the robot to operate the teaching pendant or the like. Therefore, when directly manipulating a robot in such a conventional configuration, users have been unavoidably involved in troublesome tasks. As an example of such conventional robot systems, refer to a patent document JP 2011-212837 A.

PRIOR ART REFERENCE

[Prior art reference 1] JP 2011-212837 A

SUMMARY

It is thus desired to provide a robot system in which the user can easily move the arms of the robot by directly holding the arms by hand.

A robot system according to an exemplary embodiment includes a base; a plurality of arms provided onto the base; a plurality of axes corresponding to the respective arms and connecting the arms to each other; a plurality of electric motors corresponding to the respective axes and driving the respective axes; a plurality of detection units provided to the respective arms to detect a user's manual hold action on the arms; and a control unit driving and controlling the motors based on detection conditions of the detection units to control motions of the arms. In the robot system, when the detection units have not detected any user's manual hold action, the control unit constrains the axes, and when a user's (operator's) manual hold action has been detected by the detection units, the control unit controls the corresponding motors to release constraints of the corresponding axes which correspond to the detection units that have detected the manual hold action.

With this configuration, to release constraints of the axes, the user does not have to press and hold an axis constraint-release button provided to the teaching pendant or to the robot, or does not have to select the axes, whose constraints are to be released, by using the teaching pendant. Specifically, the user can hold the arms desired to be moved and can release constraints of the axes corresponding to the arms held by the user. Thus, the user can easily move the arms by directly holding by hand the axes corresponding to the arms held by the user. Furthermore, the axes corresponding to the arms which are not held by the user are in a state of being constrained. Therefore, these arms with constrained axes are prevented from unexpectedly moving. Consequently, the user can directly touch and easily move the arms of the robot and can save time.

It has been found that, if the user holds one of the arms by one hand, the user tends to have a desire to use the base as a fulcrum and entirely move the arm held by the user together with the arms positioned between the base and the arm held by the user. In the control unit of the present configuration, when a manual hold action has been detected by one of the detection units, the control unit releases constraints of the axes positioned closer to the base than is the arm which includes the detection unit that has detected the manual hold action, and constrains the remaining axes.

With this configuration, by holding one of the arms by one hand, the user can integrally move the arm held by the user together with the arms positioned between the base and the arm held by the user, using the base as a fulcrum. Accordingly, when moving any one of the arms by one hand, the user can move the desired arm easily and even more intuitively.

Also, it has been found that, when the user manipulates two of the arms by holding these two arms by the user's respective hands, the user tends to have a desire to use the arm held by one hand, i.e. base side hand, as a fulcrum and to move these two arms integrally with the arms positioned between the arm held by one hand and the arm held by the other hand. In the control unit of the present configuration, if any manual hold action has been detected by two of the detection units, the control unit releases constraints of all the axes between two arms which are respectively provided with the detection units that have detected the manual hold action and, at the same time, constrains the remaining axes.

With this configuration, by holding two of the arms by the user's respective hands, the user can move the arm held by one hand, i.e., base side hand, and the arm held by the other hand integrally with the arms positioned between these two arms, using the arm held by one hand, i.e., base side hand, as a fulcrum. Specifically, with this configuration, the user can move, as desired, the two arms held by the user's respective hands together with the arms positioned between the two arms. Furthermore, the remaining arms, i.e., the arms positioned on the outside of the two arms held by the user's respective hands, are brought into a state of being fixed.

Therefore, when the user moves the two arms held by the user's respective hands, the outside arms which are not desired to be moved are prevented from being pulled and moved by the motions of the two arms held by the user. Thus, the user can easily move the two arms held by the user's respective hands and bring the robot into a desired posture. In this way, when moving any two of the arms by the user's respective hands, the user can move the desired two arms easily and even more intuitively.

In a state in which constraints of the axes have been released, i.e., in a state in which the user can hold and move the arms, the control unit performs gravity compensation by controlling the motors such that the arms do not move due to the own weight of the arms. Thus, the user can move the arms with light force, as desired, without feeling the weight of the arms.

Furthermore, with this configuration, when the user moves the arms and tries to stop the motions of the arms at respective target positions, the arms are not allowed to move beyond the respective target positions, which would otherwise occur due to the inertia of these arms. Thus, the motions of the arms can be immediately stopped with accuracy at the respective target positions. Consequently, when performing direct teaching, for example, this improved accuracy can be exerted.

Furthermore, when the arms are moved in a state in which constraints of the axes have been released, the control unit exerts a function of storing motions or positions of the arms. Thus, the user can hold and move the arms, so that the motions of the arms are recorded as teaching. During direct teaching, this way of recording motions can contribute to reducing the number of times of operating an operation means, not shown, provided to the robot or to an external device. Consequently, the user can even more easily perform direct teaching.

BRIEF DESCRIPTION OF THE DRAWINGS

In the accompanying drawings:

FIG. 3 is a diagram illustrating correlation between results of detection performed by detection units and constraint conditions of axes, according to the first embodiment;

FIG. 16 is a diagram illustrating correlation between results of detection performed by detection units and constraint conditions of axes, according to the third embodiment

Figure 1:
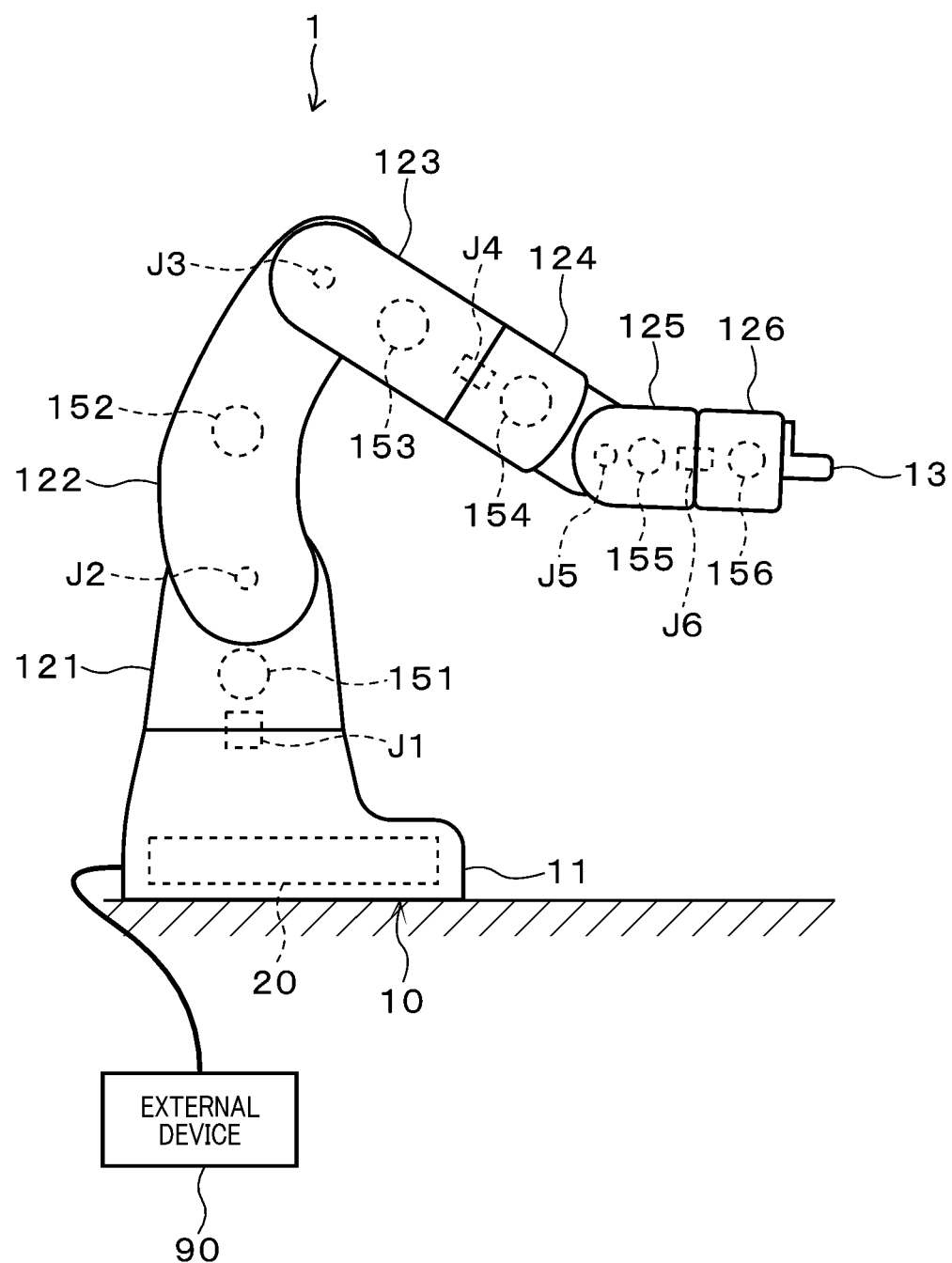
FIG. 1 is a schematic diagram illustrating a robot system, according to a first embodiment of the present disclosure.

DETAILED DESCRIPTION OF THE PREFERRED EMBODIMENTS some embodiments of the present disclosure will be described. It should be noted that the components identical with or similar to each other between the embodiments are given the same reference numerals for the sake of omitting unnecessary explanations.

First Embodiment

Referring to FIGS. 1 to 13, a first embodiment will be described.

FIG. 1 shows a robot system 1 including an articulated robot 10 (simply termed a robot 10 hereinafter) for industrial use and a control unit 20 serving as a robot controller.

The robot 10 is also referred to as a manipulator. The robot 10 is a six-axis vertical articulated robot having a plurality of arms and is controlled by the control unit 20. Of course, the number of multiple-joint arms of the robot 10 is not limited to be six, and can be four, five or another number. The robot 10 of the present embodiment is small-sized and light-weighted so that, for example, one person can carry the robot. The robot 10 of the present embodiment is assumed, for example, to cooperate with a person and thus is designed as a person-cooperative robot, eliminating the need for safety fences in the work environment of the robot. The robot 10, which is incorporated with the control unit 20, is designed to have a total weight of about 4 kg (kilograms) and a load capacity of about 500 g (grams).

The size and weight of the robot 10 are not limited to those mentioned above. Also, the control unit 20 does not have to be incorporated in the robot 10 but may be provided on the outside of the robot 10. In this case, the robot 10 and the control unit 20 are connected to each other by wire or wirelessly so that communication can be established therebetween. The control unit 20 may be connected to a computer or a mobile terminal, such as a smartphone, or may be connected to an external device 90 by wire or wirelessly so that communication can be established with the external device.

As shown in FIG. 1, the robot 10 includes a base 11, a plurality of, i.e., six, arms 121 to 126, and an end effector 13. The base 11 may be fixed to or may not be fixed to a placement surface. The arms 121 to 126 and the end effector 13 are sequentially provided onto the base 11. In the present embodiment, the arms are sequentially provided, from the base 11 side, a first arm 121, a second arm 122, a third arm 123, a fourth arm 124, a fifth arm 125 and a sixth arm 126. It should be noted that, if the arms 121 to 126 are not specifically referred to in the following description, these arms are simply collectively referred to as arm(s) 12.

The end effector 13 is provided to a distal end of the sixth arm 126. In this case, base 11 side ends of the respective arms 121 to 126 are positioned closer to the base, and end effector 13 side ends thereof are positioned closer to the distal end. The end effector 13 can be used, for example, with a robot hand, which is referred to as a chuck, gripper, suction hand or the like, being attached thereto. These attachments can be appropriately selected according to usage of the robot 10.

The arms 121 to 126 are rotatably connected to each other via a plurality of axes J1 to J6 serving as joints or linkages. These axes are sequentially provided, from the base 11, a first axis J1, a second axis J2, a third axis J3, a fourth axis 4, a fifth axis J5 and a sixth axis J6. It should be noted that, if the axes J1 to J6 are not specifically referred in the following description, these axes are simply collectively referred to as axes (or an axis) J. The first axis J1 is a rotation axis extending in the vertical direction and connecting the first arm 121 to the base 11 so as to be horizontally rotatable relative to the base 11. The second axis J2 is a rotation axis extending in the horizontal direction and connecting the second arm 122 to the first arm 121 so as to be vertically rotatable relative to the first arm 121.

The third axis J3 is a rotation axis extending in the horizontal direction and connecting the third arm 123 to the second arm 122 so as to be vertically rotatable relative to the second arm 122. The fourth axis J4 is a rotation axis extending in the longitudinal direction of the third arm 123 and connecting the fourth arm 124 to the third arm 122 so as to be rotatable relative to the third arm 122. The fifth axis J5 is a rotation axis extending in the horizontal direction and connecting the fifth arm 125 to the fourth arm 124 so as to be vertically rotatable relative to the fourth arm 124. The sixth axis J6 is a rotation axis extending in the longitudinal direction of the fifth arm 125 and connecting the sixth arm 126 to the fifth arm 125 so as to be rotatable relative to the fifth arm 125.

Figure 2:
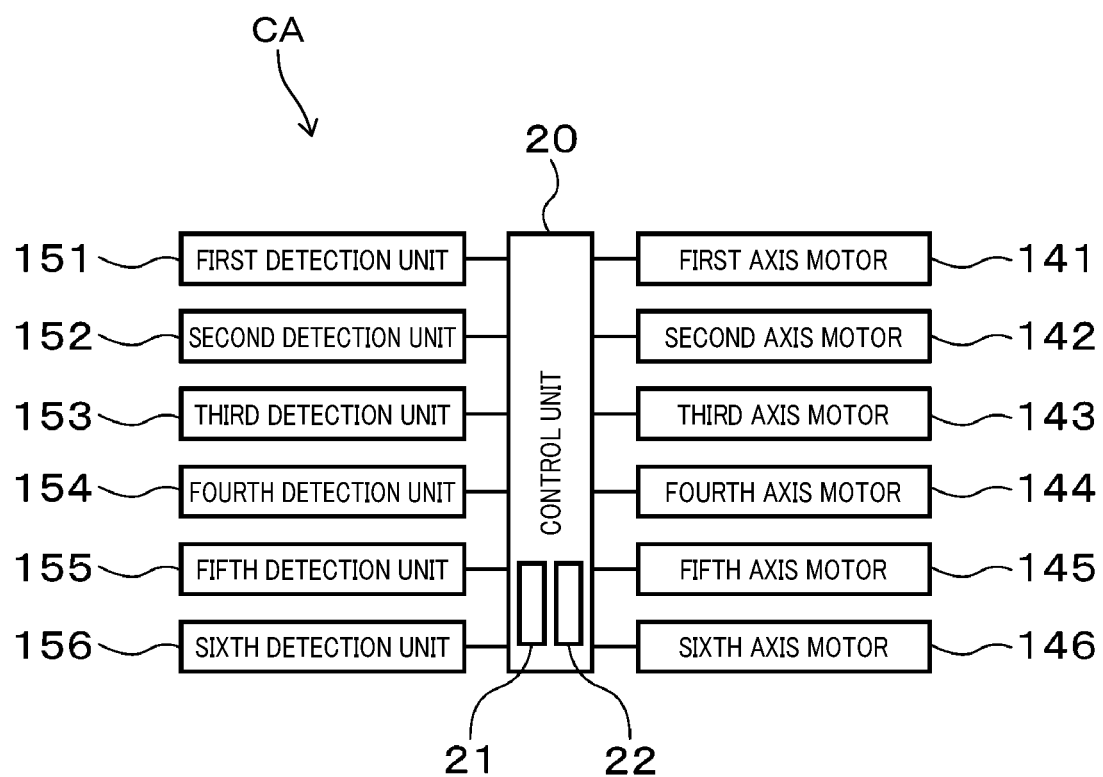
FIG. 2 is a block diagram illustrating an electrical configuration provided as a control apparatus for the robot system, according to the first embodiment.

As shown in FIG. 2, the robot 10 includes a plurality of, i.e., six, electric motors (hereinafter simply motors) 141 to 146 for respectively driving the axes J1 to J6. In the present embodiment, the motor corresponding to the first axis J1 is referred to as a first motor 141, and the motor corresponding to the second axis J2 is referred to as a second motor 142. Also, the motor corresponding to the third axis J3 is referred to as a third motor 143, and the motor corresponding to the fourth axis J4 is referred to as a fourth motor 144. Furthermore, the motor corresponding to the fifth axis J5 is referred to as a fifth motor 145, and the motor corresponding to the sixth axis J6 is referred to as a sixth motor 146. It should be noted that, if the motors 141 to 146 are not specifically referred to in the following description, these motors are simply collectively referred to as motor(s) 14.

The motors 141 to 146 each have a mechanical or electrical braking function. When brakes are applied, the motors 141 to 146 constrain the axes J1 to J6 respectively corresponding thereto to thereby limit, i.e., inhibit, rotation of the arms 121 to 126 connected to each other via the axes J1 to J6. In the present embodiment, the state in which brakes are being applied in the motors 141 to 146 is referred to as a state in which the axes J1 to J6 are constrained. Also, the state in which brakes are not being applied in the motors 141 to 146, i.e., the state in which the brakes have been released, is referred to as a state in which the axes J1 to J6 are not constrained, i.e., a state in which constraints of the axes J1 to J6 have been released.

As shown in FIGS. 1 and 2, the robot 10 includes a plurality of, i.e., six, detection units 151 to 156. The detection units 151 to 156 are respectively provided to the arms 121 to 126 to detect a user's manual hold action (i.e., an operator's grip by hand, an operator's manual holding touch: or simply referred to "hold" by hand) on the arms 121 to 126. The detection units 151 to 156 may be constituted of touch sensors using, for example, resistance films, electrostatic capacitance, ultrasonic surface elasticity or electromagnetic induction, optical touch sensors, or mechanical switches made, for example, of rubber, resin or metal. Hence, an operator can hold the arms 121 to 126 selectively, a pressing force generated due to the manual hold action and exerted on the arms 121 to 126 can be detected as electrical signals.

Incidentally, various sensors including the detection units 151 to 156 are combined with the control unit 20 to form a control apparatus CA for the robot system, as shown in FIG. 2. Although not shown, the various sensors include angle sensors of the motors to control the drive of the motors.

That is, the detection units 151 to 156 are capable of detecting user's touch (or hold) to the surfaces of the arms 121 to 126. In the present embodiment, the detection units 151 to 156 are incorporated into the respective arms 121 to 126 and ensured not to be visually recognizable from the user. The detection units 151 to 156 may be provided being exposed from the surfaces of the arms 121 to 126.

In the present embodiment, of the detection units 151 to 156, the detection unit provided to the first arm 121 is referred to as a first detection unit 151, and the detection unit provided to the second arm 122 is referred to as a second detection unit 152. Also, the detection unit provided to the third arm 123 is referred to as a third detection unit 153, and the detection unit provided to the fourth arm 124 is referred to as a fourth detection unit 154. Furthermore, the detection unit provided to the fifth arm 125 is referred to as a fifth detection unit 155, and the detection unit provided to the sixth arm 126 is referred to as a sixth detection unit 156. It should be noted that, if the detection units 151 to 156 are not specifically referred to in the following description, these detection units are simply collectively referred to as detection unit(s) 15.

The control unit 20 is mainly constituted of a CPU 21 and a microcomputer that includes a storage area 22, such as a ROM, a RAM or a rewritable flash memory, to control motions of the entire robot 10. The storage area 22, which has a function of a non-transitory computer readable recording medium, stores robot control programs for driving and controlling the robot 10. The control unit 20 allows the CPU 21 to execute the robot control program to thereby control motions of the robot 10. In the present embodiment, as shown in FIG. 2, the detection units 151 to 156 and the motors 141 to 146 are electrically connected to the control unit 20. Based on the results of detection performed by the detection units 151 to 156, the control unit 20 drives and controls the motors 141 to 146.

It has been found that, when the user directly touches and manipulates the robot 10, the user's manipulation has the following tendencies. Specifically, when the user manipulates one arm 12 among the arms 121 to 126 by holding the arm 12 by one hand, the user tends to have a desire to use the base 11 as a fulcrum and move the arm 12 integrally with the arms 12 positioned between the first arm 121 connected to the base 11 and the arm 12 held by the user. Also, when the user manipulates two arms 12 among the arms 121 to 126 by holding the two arms 12 by the user's respective hands, the user tends to have a desire to use the arm 12 held by one hand, i.e., base 11 side hand, as a fulcrum and to move these two arms 12 integrally with the arms positioned between the arm 12 held by one hand and the arm 12 held by the other hand.

Therefore, in the present embodiment, if the detection units 151 to 156 have not detected any manual hold action of the user, the control unit 20 constrains the axes J1 to J6 to inhibit motions of the arms 121 to 126. If the detection units 151 to 156 have detected any manual hold action of the user, the control unit 20 controls the corresponding motors 14 to release constraints, as shown in FIG. 3, of the corresponding axes J which correspond to the detection units 15 that have detected the user's manual hold action.

In other words, unless the user desires to directly touch and manipulate the robot 10, no manual hold action on the arms 121 to 126 will be detected, as a matter of course, in the detection units 151 to 156. Accordingly, if no manual hold action has been detected in any of the detection units 151 to 156, the control unit 20 constrains all the axes J1 to 36 to inhibit motions of all the arms 121 to 126.

If the user has tried to manipulate the robot 10 by one hand, i.e., if the user has held one arm 12 among the arms 121 to 126, the corresponding detection unit 15 among the detection units 151 to 156 will detect the user's manual hold action. Therefore, if any manual hold action to one detection unit 15 among the detection units 151 to 156 has been detected, the control unit 20 releases constraints of all the axes J closer to the base than is the arm 12 which includes the detection unit 15 that has detected the manual hold action and, at the same time, constrains the remaining axes J. Thus, the arms 12 closer to the base relative to the arm 12 held by the user are permitted to be movable, while the arms 12 closer to the distal end relative to the arm 12 held by the user are inhibited from moving.

If the user has tried to manipulate the robot 10 by both hands, i.e., if the user has held two arms among the arms 121 to 126 by the user's respective hands, the manual hold action will be detected by two detection units 15 among the detection units 151 to 156. Therefore, if any manual hold action has been detected by two detection units 15 among the detection units 151 to 156, the control unit 20 releases constraints of all the axes J between two arms 12 which respectively include the detection units 15 that have detected the manual hold action and, at the same time, constrains the remaining axes J. Thus, the arms 12 positioned between the two arms 12 held by the user are permitted to be movable, while the remaining arms 12 are inhibited from moving.

FIG. 3 is a table showing correlation between the results of detection derived from the detection units 151 to 156, and the axes J1 to J6, according to the present embodiment. In the table of FIG. 3, the mark "-" indicates that the detection units 151 to 156 have not detected any manual hold action of the user. Also, the mark "○" indicates that constraints of the axes J1 to J6 have been released, and the mark "x" indicates that the axes J1 to J6 are constrained.

Referring now to FIGS. 4 to 12, an example of the user directly manipulating the robot 10 will be described. For example, if the user's manual hold action has been detected by none of the detection units 151 to 156, the control unit 20 constrains all the axes J1 to J6 as indicated in the row that is defined by the mark "-" in the "Arm 1" and "Arm 2" columns in FIG. 3. Thus, the arms 121 to 126 of the robot 10 are brought into a state of being fixed.

Figure 4:
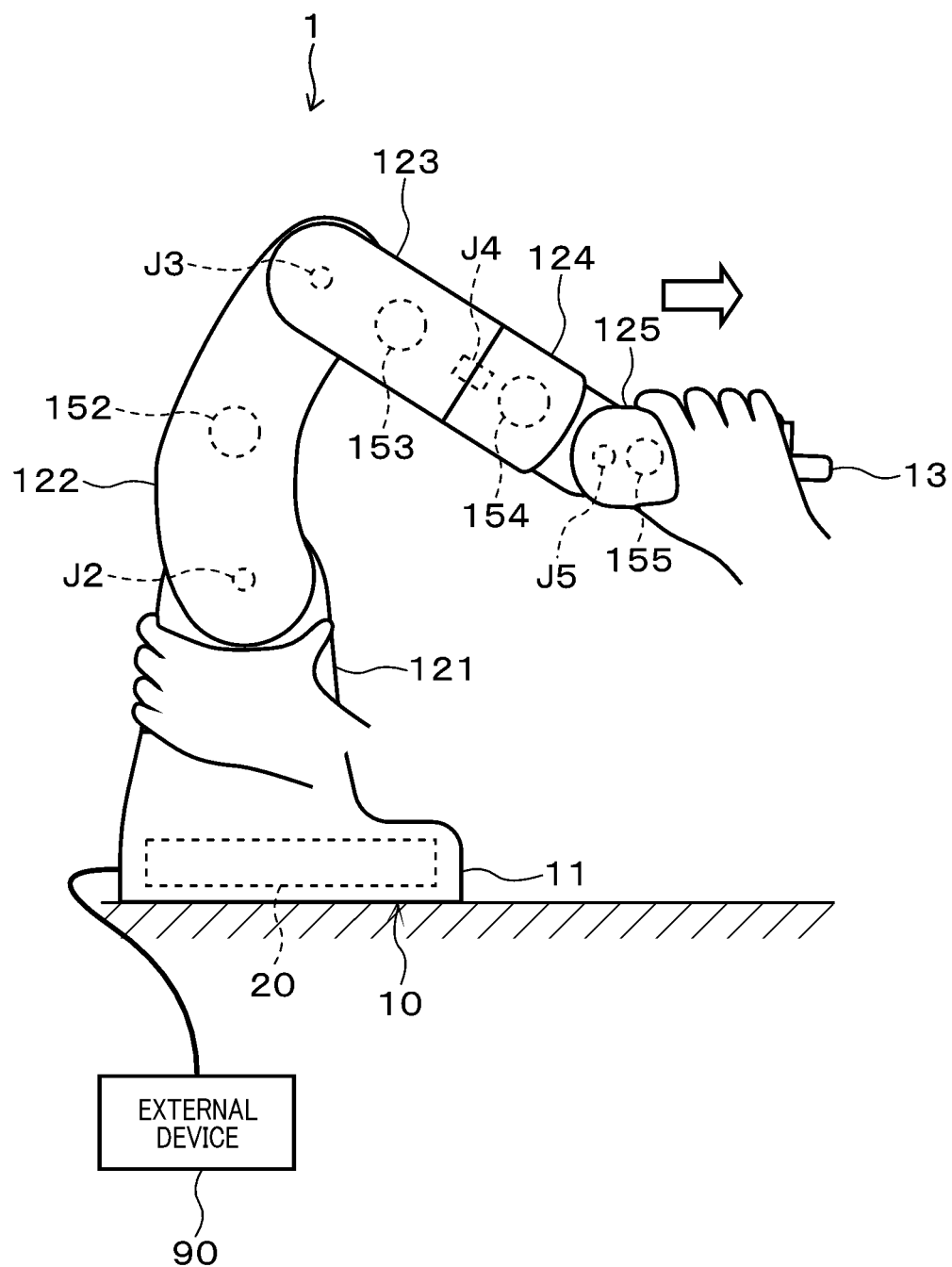
FIG. 4 is a diagram illustrating a first example of a robot manipulation mode, according to the first embodiment.
Figure 5:
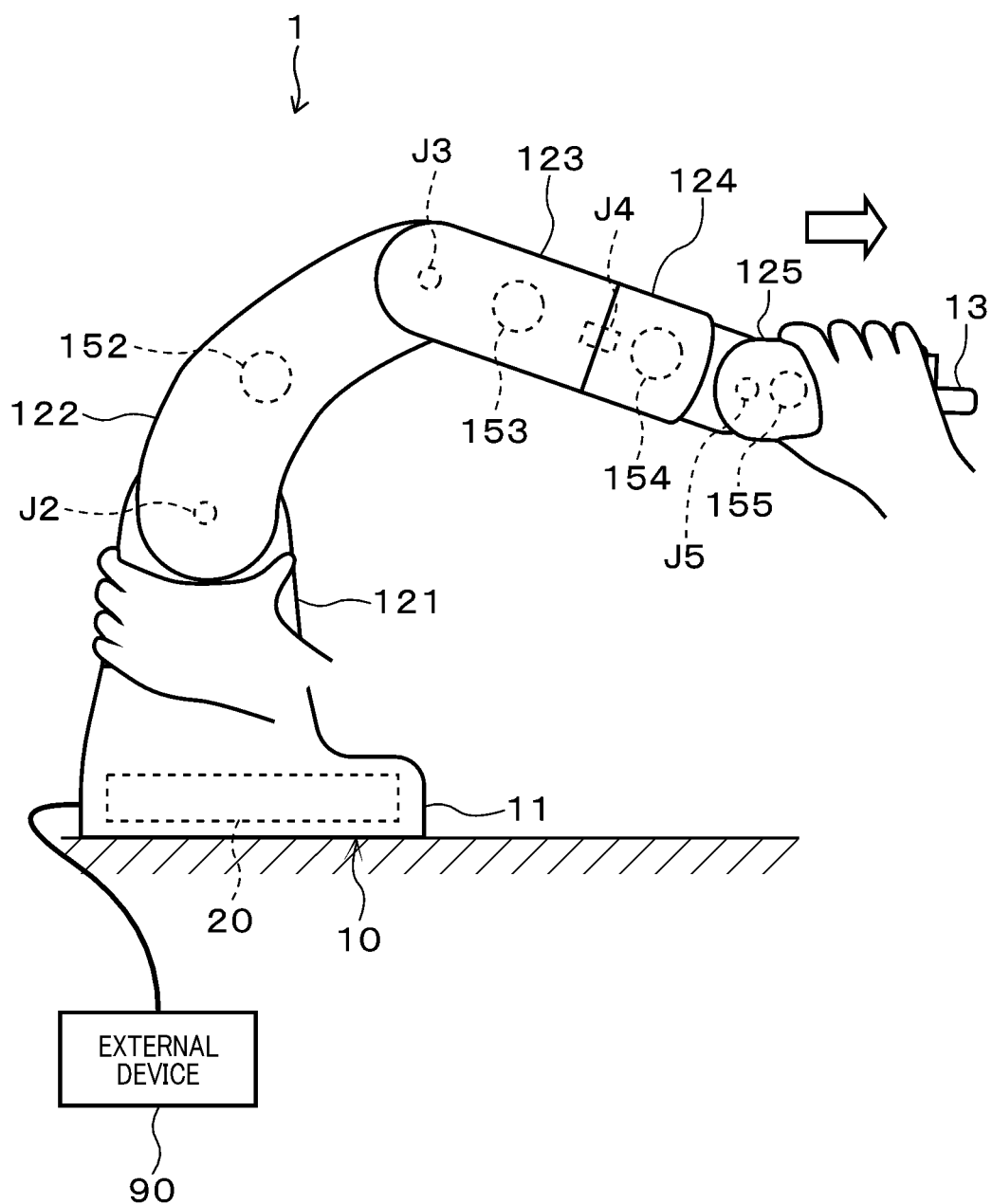
FIG. 5 is a diagram illustrating a second example of a robot manipulation mode, according to the first embodiment.

As shown in FIG. 4, if the user holds the first and sixth arms 121 and 126 by the user's respective hands and tries to move the sixth arm 126 using the first arm 121 as a fulcrum, the user's manual hold action is detected by two detection units, i.e., the first and sixth detection units 151 and 156. In this case, as indicated in the row that is defined by the "First detection unit" in the "Arm 1" column and the "Sixth detection unit" in the "Arm 2" column in FIG. 3, the control unit 20 constrains the first axis J1 and releases constraints of the second to sixth axes J2 to J6. Thus, as shown in FIGS. 4 and 5, the user can move the sixth arm 126 using the first arm 121 as a fulcrum.

Figure 6:
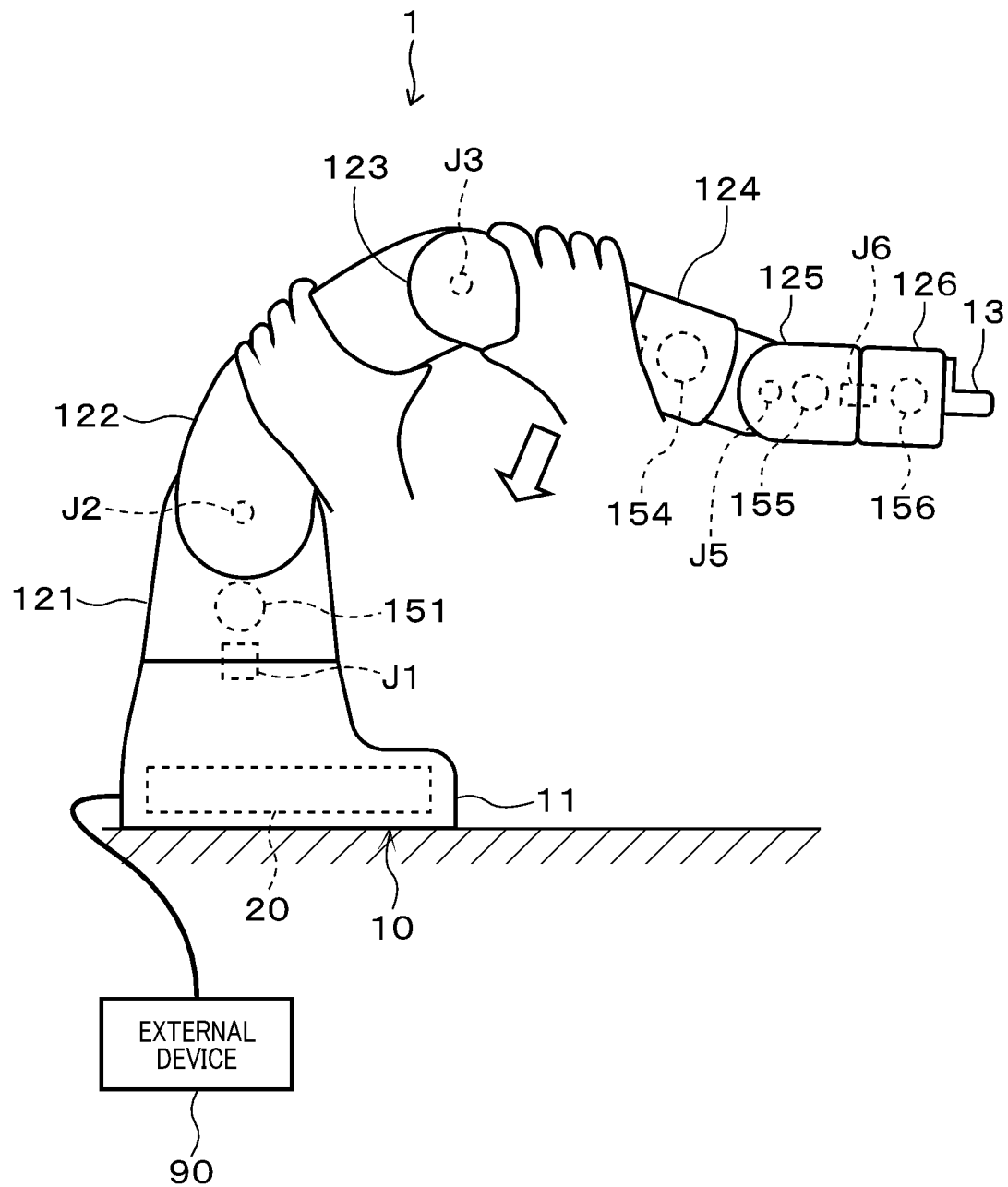
FIG. 6 is a diagram illustrating a third example of a robot manipulation mode, according to the first embodiment.
Figure 7:
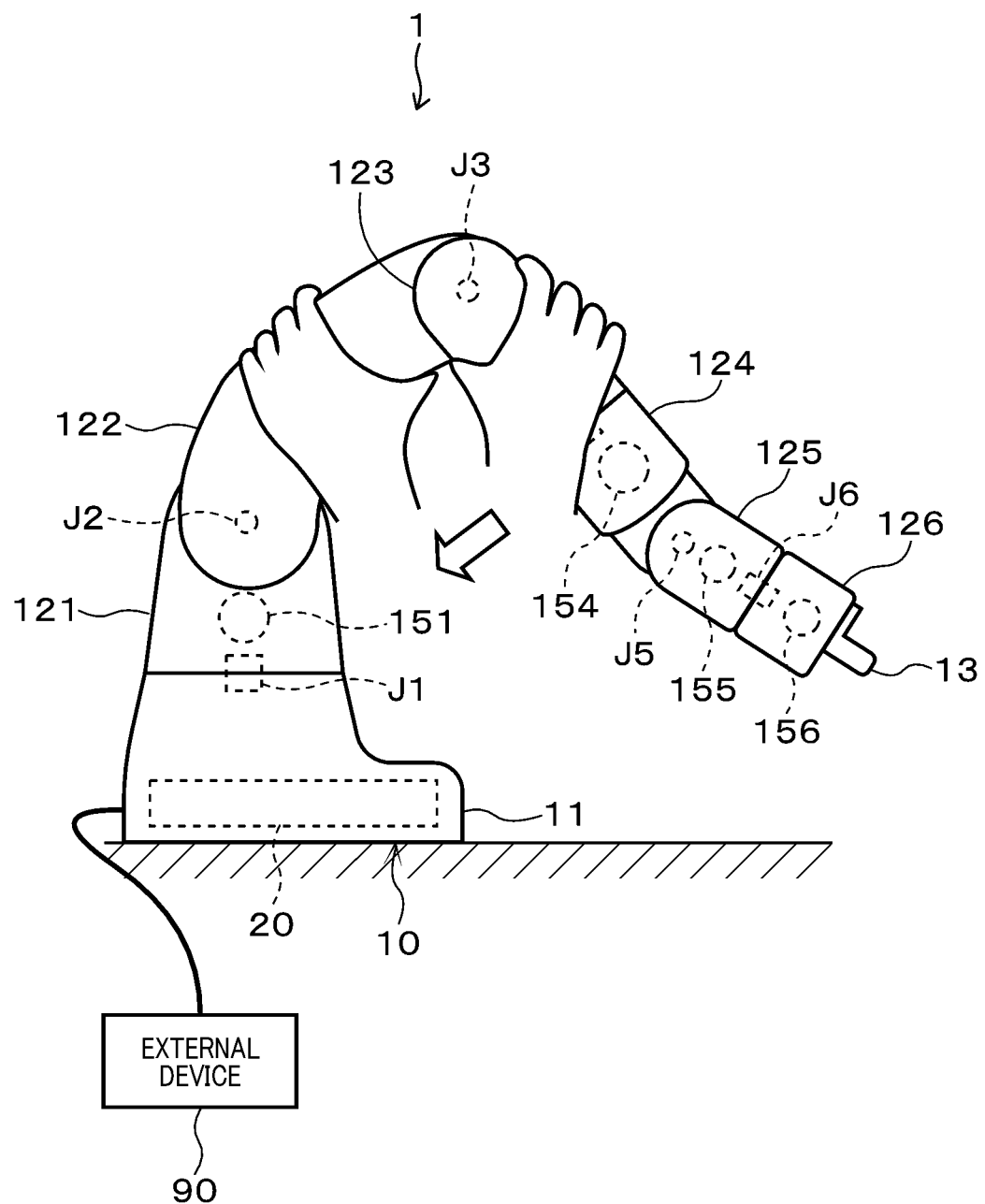
FIG. 7 is a diagram illustrating a fourth example of a robot manipulation mode, according to the first embodiment.

For example, as shown in FIG. 6, if the user holds the second and third arms 122 and 123 by the user's respective hands and tries to move the third arm 123 using the second arm 122 as a fulcrum, the user's manual hold action is detected by two detection units, i.e., the second and third detection units 152 and 153. In this case, as indicated in the row that is defined by the "Second detection unit" in the "Arm 1" column and the "Third detection unit" in the "Arm 2" column in FIG. 3, the control unit 20 releases the constraint of the third axis J3 positioned between the second and third arms 122 and 123 and constrains all the remaining axes J1, J2 and J4 to J6. Thus, as shown in FIGS. 6 and 7, the user can move only the third arm 123 using the second arm 122 as a fulcrum, with all the arms except for the third arm 123 being fixed.

Figure 8:
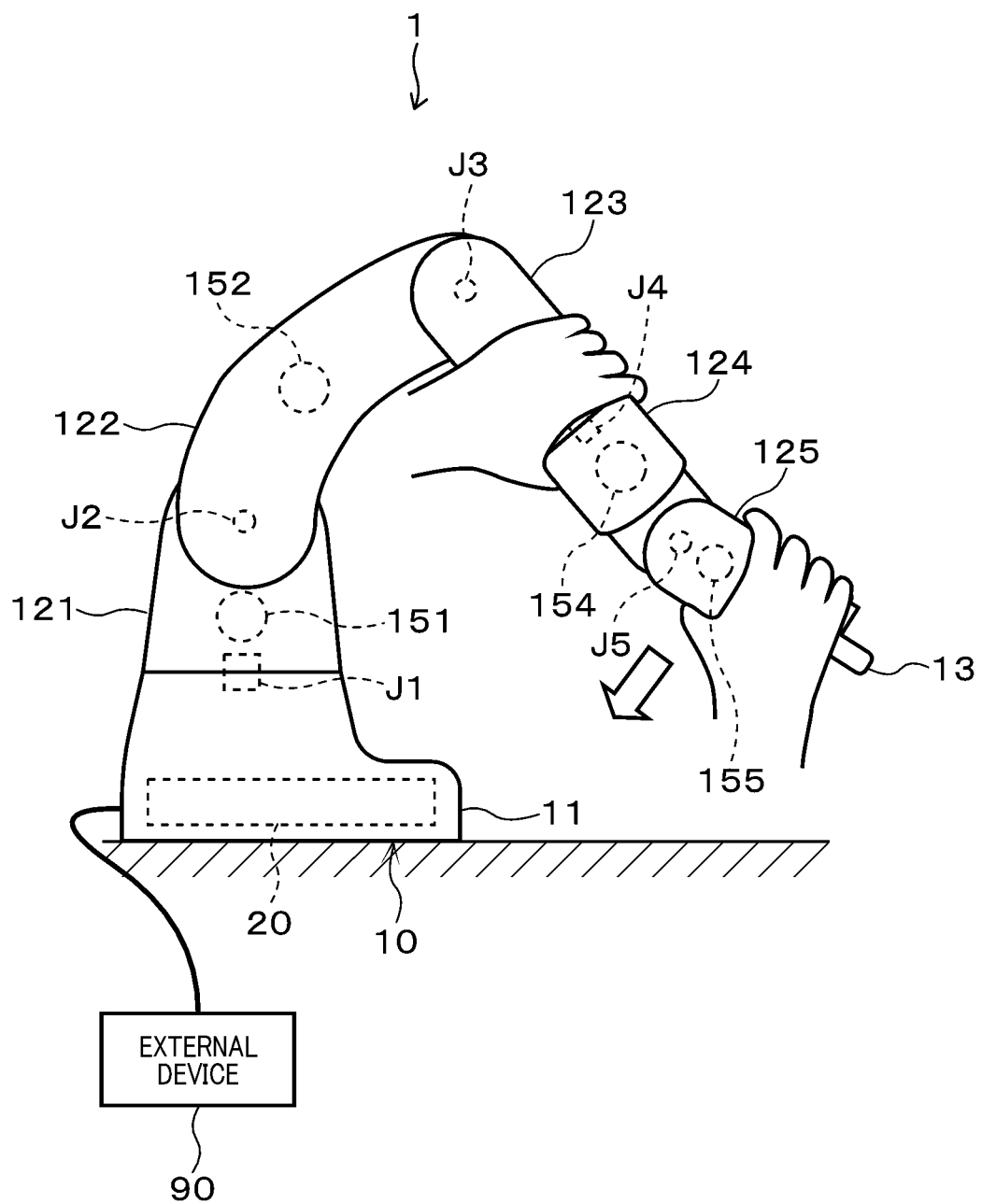
FIG. 8 is a diagram illustrating a fifth example of a robot manipulation mode, according to the first embodiment.
Figure 9:
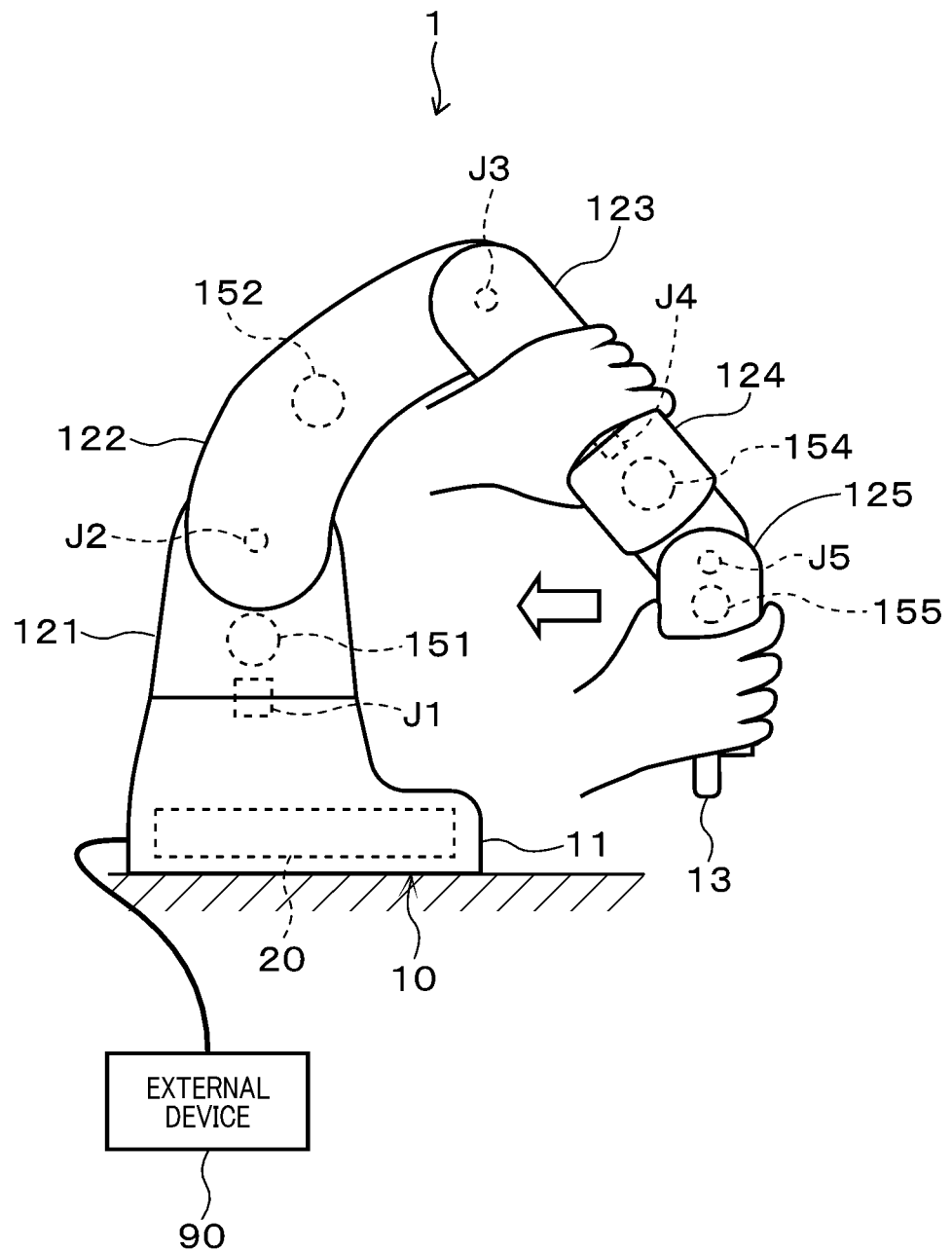
FIG. 9 is a diagram illustrating a sixth example of a robot manipulation mode, according to the first embodiment.

For example, as shown in FIG. 8, if the user holds the third and sixth arms 123 and 126 by the user's respective hands and tries to move the fourth, fifth and sixth arms 124, 125 and 126 using the third arm 123 as a fulcrum, the user's manual hold action is detected by two detection units, i.e., the third and sixth detection units 153 and 156. In this case, as indicated in the row that is defined by the "Third detection unit" in the "Arm 1" column and the "Sixth detection unit" in the "Arm 2" column in FIG. 3, the control unit 20 releases constraints of all the axes J4 to J6 between the third and sixth arms 123 and 126 and constrains all the remaining axes J1 to J3. Thus, as shown in FIGS. 8 and 9, the user can move the fourth, fifth and sixth arms 124, 125 and 126, with the first, second and third arms 121, 122 and 123 being fixed.

Figure 10:
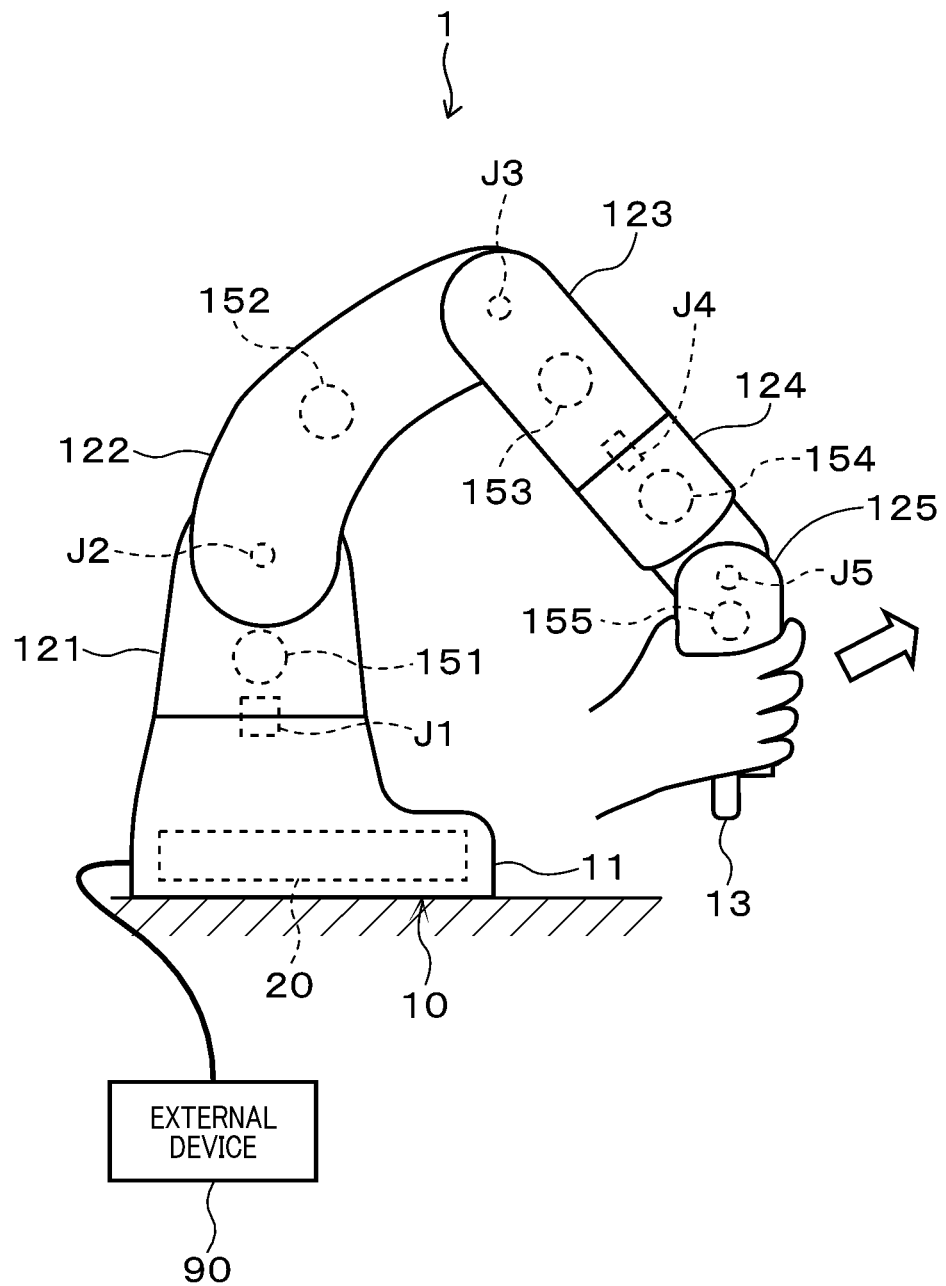
FIG. 10 is a diagram illustrating a seventh example of a robot manipulation mode, according to the first embodiment.
Figure 11:
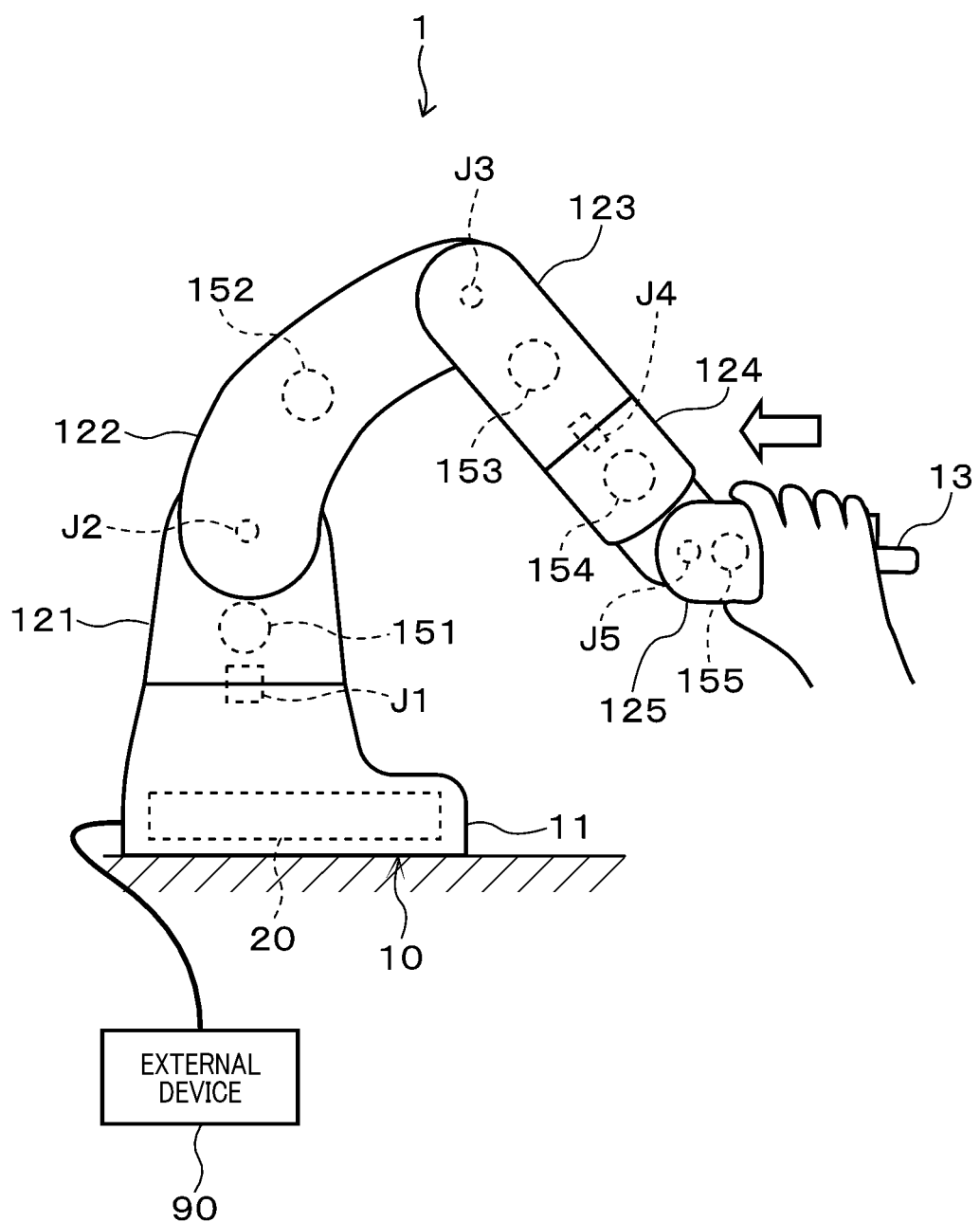
FIG. 11 is a diagram illustrating an eighth example of a robot manipulation mode, according to the first embodiment.
Figure 12:
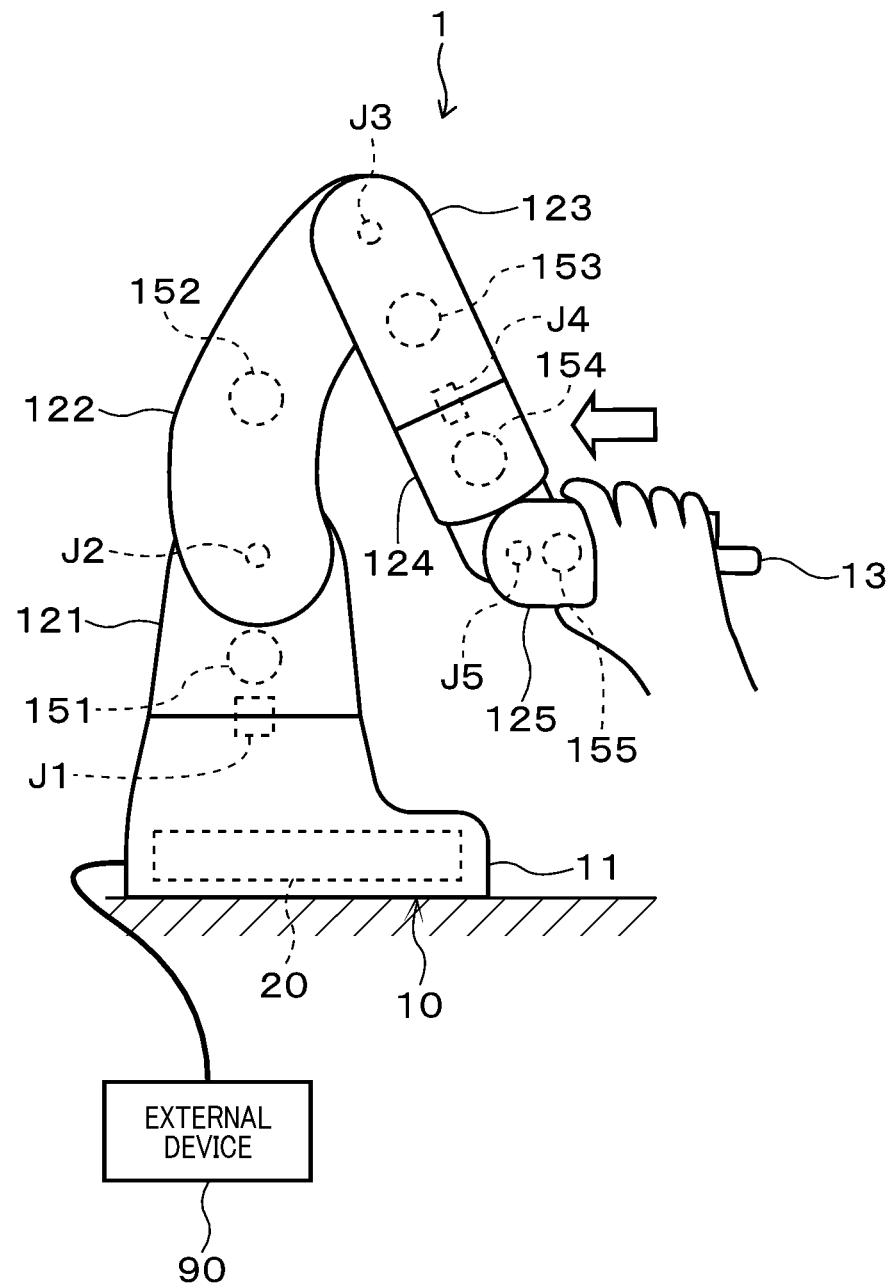
FIG. 12 is a diagram illustrating a ninth example of a robot manipulation mode, according to the first embodiment.

For example, as shown in FIG. 10, if the user holds the sixth arm 126 by one hand and tries to move the entire robot 10, the user's manual hold action is detected by only the sixth detection unit 156. In this case, as indicated in the row that is defined by the "Sixth detection unit" in the "Arm 1" column and the mark "-" in the "Arm 2" column in FIG. 3, the control unit 20 releases constraints of all the axes J1 to J6 positioned between to the base 11 and the sixth arm 126. Thus, as shown in FIGS. 10 to 12, the user can move all the arms 121 to 126 by holding the sixth arm 126.

In a state in which constraints of the axes J1 to J6 have been released, the control unit 20 performs gravity compensation by controlling the motors 141 to 146, so that the arms 121 to 126, which are connected to the constraint-released axes J1 to J6, do not move due to the own weight of the arms 121 to 126. In this case, the motors 141 to 146 generate weak torque that is sufficient to resist against the torque applied to the motors 141 to 146 due to the own weight of the arms 121 to 126. Therefore, even when constraints of the axes J1 to J6 have been released, the user can move the arms 121 to 126 with light force, as desired, without feeling the weight of the arms 121 to 126.

Figure 13:
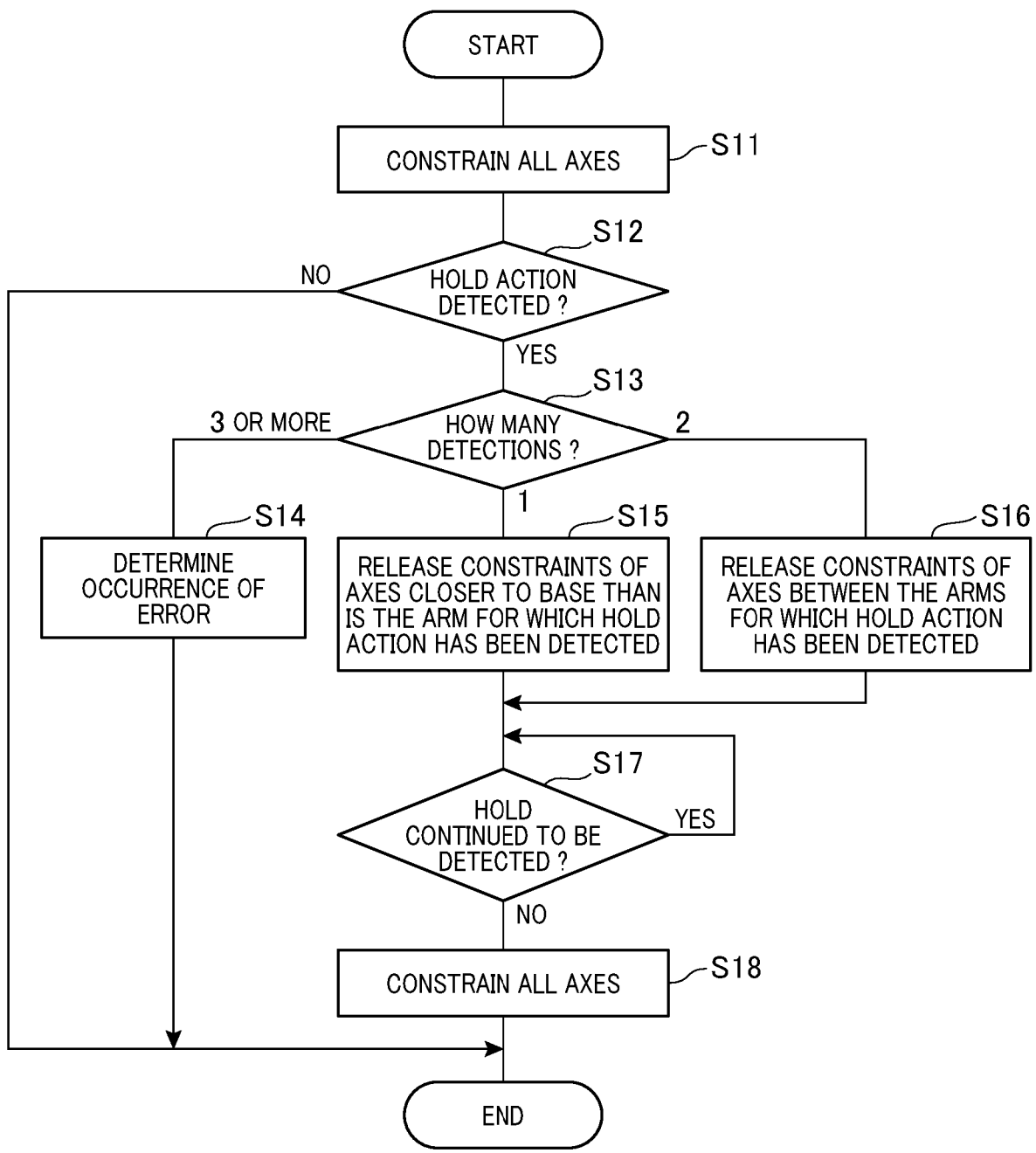
FIG. 13 is a flow diagram illustrating control performed by a control unit, according to the first embodiment.

Referring to FIG. 13 as well, control performed by the control unit 20 will be described. When control is started (start), the control unit 20 allows the CPU 21 to execute the robot control program with a processing procedure as shown in FIG. 13. First, at step S11, the control unit 20 activates brakes of the respective motors 141 to 146 to constrain the axes J1 to J6. Thus, the robot 10 is brought into a state in which the arms 121 to 126 are fixed, i.e., locked.

Then, at step S12, the control unit 20 determines whether any hold (gripping or touching) operation has been detected by the detection units 151 to 156. If no manual hold action has been detected (NO at step S12), the control unit 20 terminates the processing (end). If any manual hold action has been detected (YES at step S12), the control unit 20 allows the processing to proceed to step S13.

At step S13, the control unit 20 confirms the number of detections performed by the detection units 151 to 156. If any manual hold action has been detected by three or more detection units among the detection units 151 to 156 (three or more at step S13), it is difficult to determine the user's intention, i.e., which of the arms 121 to 126 the user desires to move. Therefore, in this case, the control unit 20 allows processing to proceed to step S14 to determine the occurrence of error, and then terminates the processing (end).

If any manual hold action has been detected by one detection unit among the detection units 151 to 156 ("one" at step S13), the control unit 20 allows the processing to proceed to step S15. Then, at step S15, the control unit 20 releases constraints, as shown in the table of FIG. 3, of the axes J closer to the base 11 among the axes J1 to J6 than is the arm 12 for which the manual hold action has been detected and, at the same time, retains constraints of the remaining axes J. After that, the control unit 20 allows the processing to proceed to step S17.

If any manual hold action has been detected by two detection units among the detection units 151 to 156 ("two" at step S13), the control unit 20 allows the processing to proceed to step S16. Then, at step S16, the control unit 20 releases constraints, as shown in the table of FIG. 3, of the axes J positioned between the two arms 12 for which the manual hold action has been detected and, at the same time, retains constraints of the remaining axes J. After that, the control unit 20 allows the processing to proceed to step S17.

At step S17, the control unit 20 determines whether detection of the manual hold action is being continued by the detection units 151 to 156 (in other words, the manual hold action has been finished or not). If detection of the manual hold action is being continued, the control 20 iterates the processing of step S17 and allows the axes J to be retained in a constrained or constraint-released state at step S15 or S16.

If a manual hold action is no longer detected by the detection units 151 to 156 due to the user losing his/her hold on the arms 121 to 126, the control unit 20 allows the processing to proceed to step S18. At step S18, the control unit 20 activates brakes of the respective motors 141 to 146, as in the processing at step S11, to constrain the axes J1 to J6. Thus, the robot 10 is again brought into a state in which the arms 121 to 126 are fixed, i.e., locked. While the robot control program is being executed, the control unit 20 iterates the processing shown in FIG. 13 from the start to the end.

In the foregoing configurations, the control unit 20 is able to function as a hold determining unit and a constraint controlling unit. In addition, the step S11 functionally configures an initial constraint controlling unit (or step), the step S12 functionally configures a first determination unit (or step), a determined-NO loop from the step S12 functionally configures a first control unit (step), a pair of the steps S12 and S13 functionally configures second and third determination units (steps), the step S15 functionally configures a second control unit (step), the step S16 functionally configures a third control unit (step), the step S17 functionally configures a fourth determination unit, and the step S18 functionally configures a fourth control unit.

According to the embodiment described above, the robot system 1 includes the articulated robot 10 and the control unit 20. The articulated robot 10 includes the base 11, a plurality of, i.e., six, arms 121 to 126, a plurality of, i.e., six, axes J1 to J6, a plurality of, i.e., six, motors 141 to 146, and a plurality of, i.e., six, detection units 151 to 156. The arms 121 to 126 are connected to each other and provided onto the base 11. The axes J1 to J6 are provided to the respective arms 121 to 126 to connect the arms 121 to 126 to each other. The motors 141 to 146 are provided to the respective axes J1 to J6 to drive the axes J1 to J6. The detection units 151 to 156 are provided to the respective arms 121 to 126 to detect a user's manual hold action.

The control unit 20 drives and controls the motors 141 to 146 based on the detection conditions of the detection units 151 to 156 to thereby control motions of the arms 121 to 126. If the detection units 151 to 156 have not detected any manual hold action of the user, the control unit 20 constrains the axes J1 to J6. If the detection units 151 to 156 have detected any manual hold action of the user, the control unit 20 controls the corresponding motors 14 and releases constraints of the corresponding axes J which correspond to the detection units 15 that have detected the user's manual hold action.

With this configuration, to release constraints of the axes J1 to J6, the user does not have to press and hold the axis constraint-release button provided to the teaching pendant or to the robot 10, or does not have to select the axes J, whose constraints are to be released, by using the teaching pendant. Specifically, the user can hold the arms 121 to 126 desired to be moved and can release constraints of the axes J corresponding to the arms 12 held by the user. Thus, the user can easily move the arms 12 by directly holding by hand the axes J corresponding to the arms 12 held by the user. Furthermore, the axes J corresponding to the arms 12 which are not held by the user are brought into a state of being constrained. Therefore, these arm 12 with constrained axes J are prevented from unexpectedly moving. Consequently, the user can directly touch and easily move the arms 121 to 126 of the robot 10 and can save time.

As described above, if the user holds one of the arms 121 to 126 by one hand, the user tends to have a desire to use the base 11 as a fulcrum and move the arm 12 held by the user together with the arms 12 positioned between the base 11 and the arm 12 held by the user. In this regard, if any manual hold action has been detected by one detection unit 15 among the detection units 151 to 156, the control unit 20 of the present embodiment releases the axes J positioned closer to the base than is the arm 12 which includes the detection unit 15 that has detected the manual hold action and, at the same time, constrains the remaining axes J.

With this configuration, by holding one of the arms 121 to 126 by one hand, the user can integrally move the arm 12 held by the user together with the arms 12 positioned between the base 11 and the arm 12 held by the user, using the base 11 as a fulcrum. Accordingly, when moving any one of the arms 121 to 126 by one hand, the user can move the desired arm 12 easily and even more intuitively.

As described above, if the user holds two arms 12 among the arms 121 to 126 by the user's respective hands and manipulate them, the user tends to have a desire to integrally move the arm 12 held by one hand and the arm 12 held by the other hand together with the arms 12 positioned between these two arms 12, using the arm 12 held by one hand as a fulcrum. In this regard, if any manual hold action has been detected by two detection units 15 among the detection units 151 to 156, the control unit 20 of the present embodiment releases constraints of the axes J between the two arms 12 which respectively include the detection units 15 that have detected the manual hold action and, at the same time, constrains the remaining axes J.

With this configuration, by holding two arms 12 among the arms 121 to 126 by the user's respective hands, the user can integrally move the arm 12 held by one hand and the arm 12 held by the other hand together with the arms 12 positioned between these two arms 12, using the arm 12 held by one hand, i.e., the base 11 side hand, as a fulcrum. Specifically, with this configuration, the user can move, as desired, the two arms 12 held by the user's respective hands together with the arms 12 positioned between the two arms 12.

Furthermore, the remaining arms 12, i.e., the arms 12 positioned on the outside of the two arms 12 held by the user's respective hands, are brought into a state of being fixed. Therefore, when the user moves the two arms 12 held by the user's respective hands, the outside arms 12 which are not desired to be moved are prevented from being pulled and moved by the motions of the two arms 12 held by the user. Thus, the user can easily move the two arms 12 held by the user's respective hands and bring the robot 10 into a desired posture. In this way, according to the present embodiment, when moving any two of the arms 121 to 126 by the user's respective hands, the user can move the desired two arms 12 among the arms 121 to 126 easily and even more intuitively.

When the axes J1 to J6 have been released, i.e., when the arms 121 to 126 are in a state in which they can be held and moved by the user, the control unit 20 performs gravity compensation by controlling the motors 141 to 146 such that the arms 121 to 126 do not move due to the own weight of the arms 121 to 126. Thus, the user can move the arms 121 to 126 with light force, as desired, without feeling the weight of the arms 121 to 126.

With this configuration, when the user moves the arms 121 to 126 and tries to stop the motions of the arms at respective target positions, the arms 121 to 126 are not allowed to move beyond the target positions, which would otherwise occur due to the inertia of the arms 121 to 126. Thus, the motions of the arms 121 to 126 can be immediately stopped with accuracy at the target positions. Consequently, when performing direct teaching, for example, this improved accuracy can be exerted.

Second Embodiment

Figure 14:
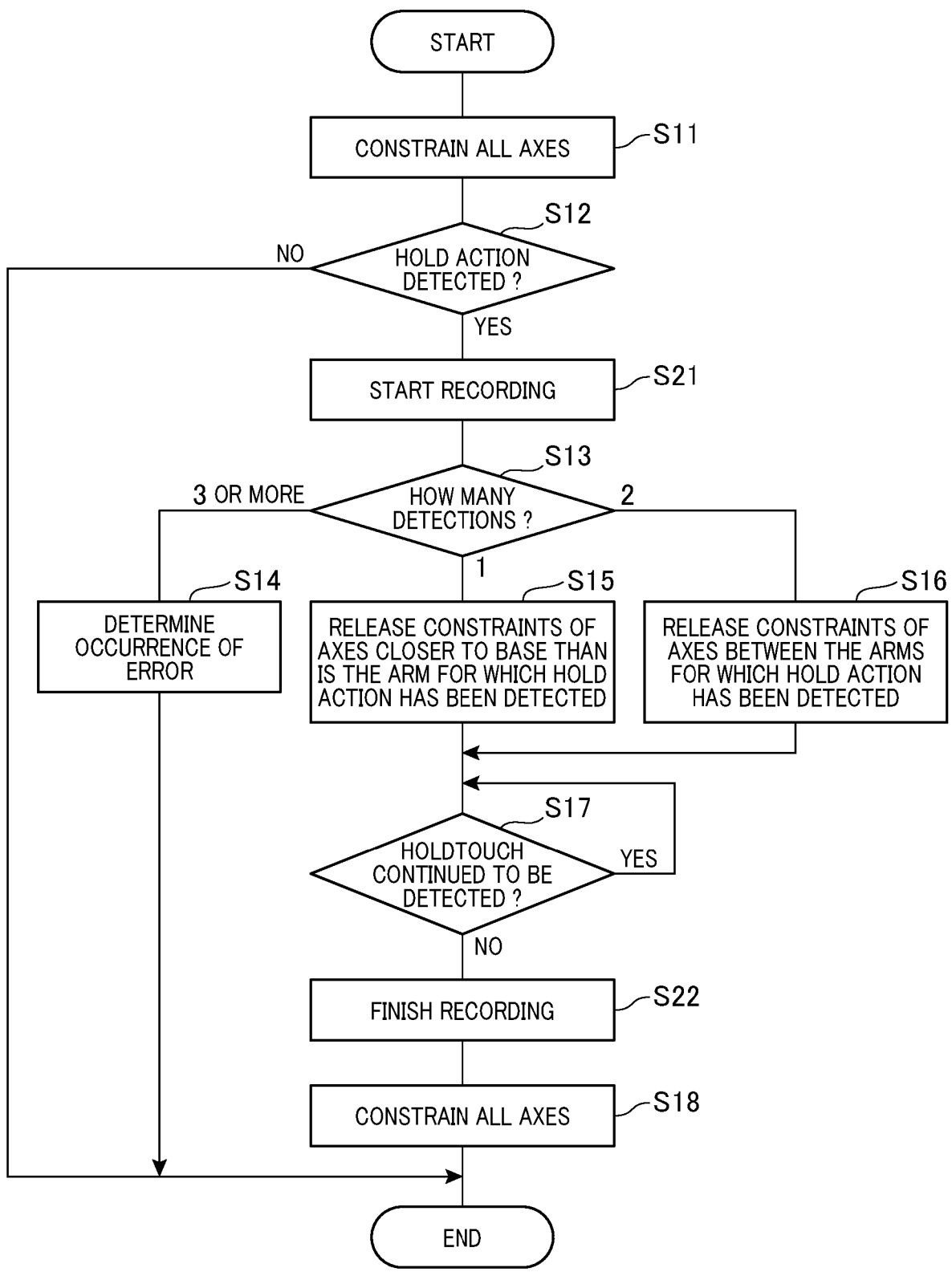
FIG. 14 is a flow diagram illustrating control performed by a control unit, according to a second embodiment of the present disclosure.

Referring to FIG. 14, a second embodiment of the present disclosure will be described.

The present embodiment relates to control during direct teaching in which the user touches and moves the robot 10.

In the present embodiment, as shown in FIG. 14, the control unit 20 performs steps S21 and S22 in addition to the processing shown in FIG. 13. Prior to starting the processing shown in FIG. 14, the user may switch mode to a direct teaching mode for performing direct teaching, by operating an operation means, not shown, provided to the robot 10 or to an external device 90.

As shown in FIG. 14, if the detection units 151 to 156 detects any manual hold action (YES at step S12), the control unit 20 allows the processing to proceed to step S21 where the control unit 20 starts recording the teaching, e.g., motion (movement) paths, moving velocities or positions of the arms 121 to 126. If the user loses his/her hold on the arms 121 to 126, the detection units 151 to 156 no longer detect a manual hold action (NO at step S17). Thus, the control unit 20 determines that the direct teaching has finished. Then, at step S22, the control unit 20 finishes recording of the teaching.

With this configuration, the user can easily perform direct teaching by touching or holding the arms 121 to 126. According to the present embodiment, the user can hold and move the arms 121 to 126, so that the motions of the arms 121 to 126 are recorded as teaching. During direct teaching, this way of recording motions can contribute to reducing the number of times of operating the operation means, not shown, provided to the robot 10 or to the external device 90. Consequently, the user can even more easily perform direct teaching.

Third Embodiment

Figure 15:
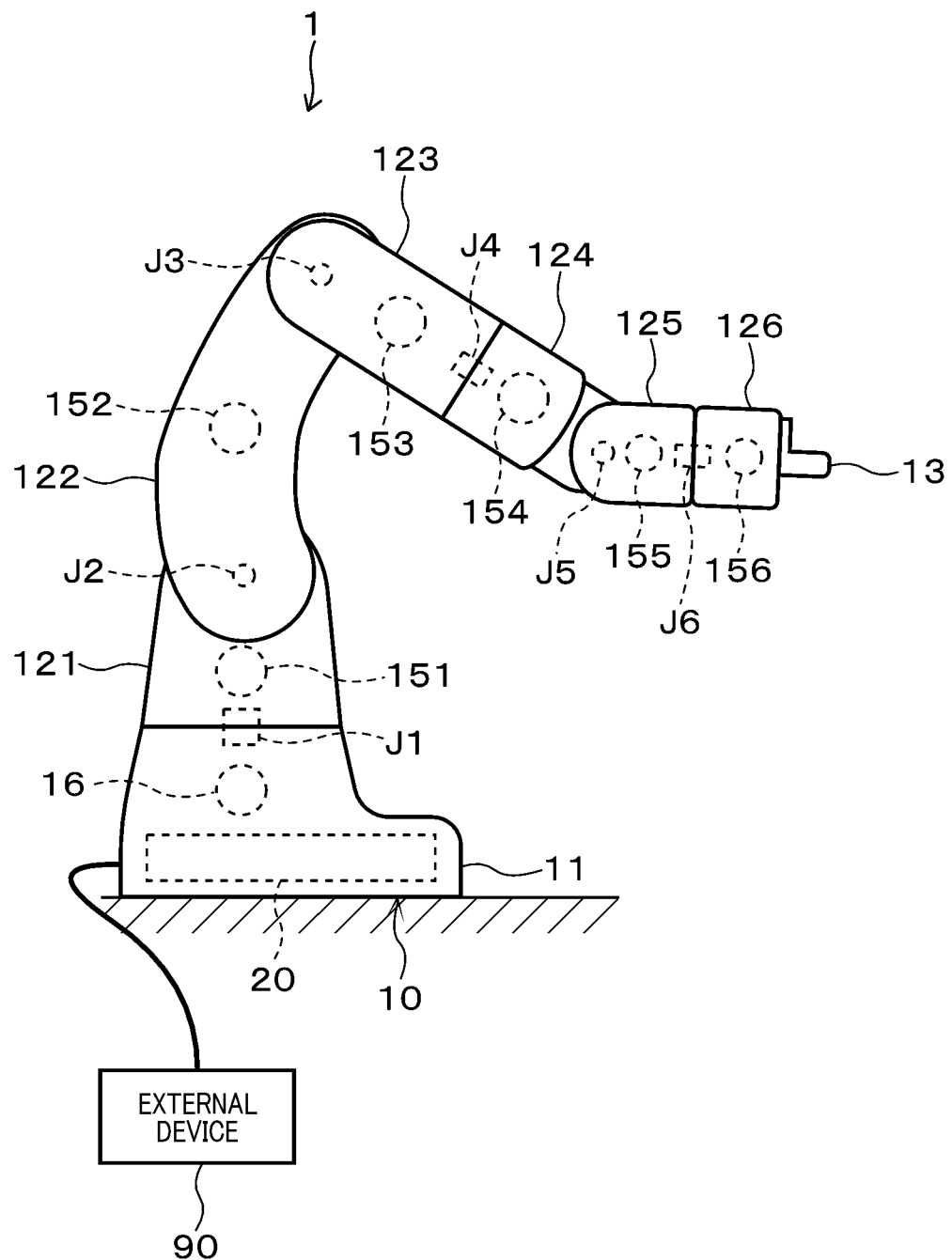
FIG. 15 is a schematic diagram illustrating a robot system, according to a third embodiment of the present disclosure.

Referring to FIGS. 15 and 16, a third embodiment of the present disclosure will be described.

In the third embodiment, the robot 10 additionally includes a base detection unit 16. The base detection unit 16 has a configuration similar to those of the detection units 151 to 156 and is provided to the base 11. The base detection unit 16 detects a user's manual hold action on the base 11. If any manual hold action has been detected by the detection units 151 to 156 and 16, the control unit 20 controls the corresponding motors 14, as shown in FIG. 16, corresponding to the detection units 15 and/or 16 that have detected the manual hold action and releases the corresponding axes J.

In this case, unless any manual hold action is detected by two of the detection units 151 to 156 and 16, constraints of all the axes J1 to J6 are retained. Specifically, if any manual hold action has been detected by only one of the detection units 151 to 156 and 16, none of the axes J1 to J6 is released from constraints. If any manual hold action has been detected by the base detection unit 16 and by one of the detection units 151 to 156 that are respectively provided to the arms 121 to 126, the control unit 20 releases constraints of the axes J between the arm 12, which includes the detection unit 15 that has detected the manual hold action, and the base 11. Specifically, the control unit 20 performs control as in the case where a manual hold action has been detected by one detection unit 15 in the first embodiment.

With this configuration, the user cannot move the arms 121 to 126 unless the user holds the arms 121 to 126 by both hands. Specifically, the robot 10 is ensured not to be moved if the user holds the arms 121 to 126 only by one hand. In other words, to move the arms 121 to 126 of the robot 10 of the present embodiment, the user requires to have a clear intention of holding the arms 121 to 126 by both hands. Accordingly, for example, if the user has unintentionally touched or held the arms 121 to 126, the arms 121 to 126 are prevented from erroneously moving.

In the embodiments described above, the detection units 151 to 156 and 16 may be respectively provided to the arms 121 to 126 and the base 11 by a plural number. Alternatively, the arms 121 to 126 and the base 11 may each have a surface the entirety of which can serve as a region capable of detecting a manual hold action.

The robot 10 is not limited to a six-axis vertical articulated robot but may be a horizontal articulated robot. The number of axes of the robot may be arbitrarily changed.

The present disclosure is not limited to the embodiments described above and illustrated in the drawings but may be modified as appropriate within a range not departing from the spirit of the disclosure.

What is claimed is:

1. An articulated robot system comprising:
   a base;
   a plurality of arms mutually connected to provide a manipulator on the base;
   a plurality of axes each rotatably connecting mutually adjacent two arms of the arms to each other;
   a plurality of electric motors mounted in the arms and that drive the respective axes for enabling rotatable connection between the mutually adjacent two arms of the arms;
   a plurality of detection units, each of the arms being provided with a corresponding one of the detection units, and each of the detection units being configured to detect a signal showing a user's manual hold of the arm on which the corresponding detection unit is provided; and
   a control unit configured to control drive of the motors based on information detected by the detection units for control of motions of the arms, the motions including constraint of at least part of the arms by braking at least one of the motors, wherein,
   when the signal shows that the detection units have not detected any user's manual hold, the control unit is configured to control the drive of the motors to constrain the axes, and
   when the signal shows that the user's manual hold has been detected by one or more of the detection units, the control unit is configured to control a corresponding one or more of the motors to release constraints of one or more of the axes corresponding to the one or more of the detection units that have detected the user's manual hold, until the detection units stop detecting the signal showing that the user's manual hold has been detected; and
   wherein when the one or more of the detection units that detect the user's manual hold are a single detection unit, the control unit is configured to control the motors to release constraints of designated axes of the axes, the designated axes being all of the axes that are positioned between the base and the arm whose detection unit has detected the user's manual hold.

2. The articulated robot system according to claim 1, wherein, in a state in which constraints of the axes have been released, the control unit is configured to perform gravity compensation by controlling the motors such that the arms do not move due to own weight of the arms.

3. The articulated robot system according to claim 1, wherein, the control unit is configured to determine movement of the arms in a state in which constraints of the axes have been released, and store motions or positions of the arms when it is determined that the arms are moved in the state.

4. An articulated robot system comprising:
   a base;
   a plurality of arms mutually connected to provide a manipulator on the base;
   a plurality of axes each rotatably connecting mutually adjacent two arms of the arms to each other;
   a plurality of electric motors mounted in the arms and that drive the respective axes for enabling rotatable connection between the mutually adjacent two arms of the arms;
   a plurality of detection units, each of the arms being provided with a corresponding one of the detection units, and each of the detection units being configured to detect a signal showing a user's manual hold of the arm on which the corresponding detection unit is provided; and
   a control unit configured to control drive of the motors based on information detected by the detection units for control of motions of the arms, the motions including constraint of at least part of the arms by braking at least one of the motors, wherein,
   when the signal shows that the detection units have not detected any user's manual hold, the control unit is configured to control the drive of the motors to constrain the axes, and
   when the signal shows that the user's manual hold has been detected by one or more of the detection units, the control unit is configured to control a corresponding one or more of the motors to release constraints of one or more of the axes corresponding to the one or more of the detection units that have detected the user's manual hold, until the detection units stop detecting the signal showing that the user's manual hold has been detected; and
   wherein when the one or more of the detection units that detect the user's manual hold are two detection units with another detection unit provided therebetween, the control unit is configured to control the drive of the motors to release constraints of designated axes of the axes, the designated axes being all of the axes that are positioned between the two arms whose detection units have detected the user's manual hold.

5. The articulated robot system according to claim 4, wherein, in a state in which constraints of the axes have been released, the control unit is configured to perform gravity compensation by controlling the motors such that the arms do not move due to own weight of the arms.

6. An articulated robot system, comprising
   a base;
   a plurality of arms formed on the base, the arms being articulated arms provided with a plurality of axes located between mutually adjacent two of the arms, the arms being linked relatively rotatably via the axes;
   a plurality of electric motors each arranged to a corresponding one of the plurality of axes and configured to drive rotation of each of the plurality of arms;
   a plurality of detection units, each of the plurality of arms being provided with a corresponding one of the detection units, and each of the detection units being configured to detect a signal showing whether or not an operator manually holds the arm on which the corresponding detection unit is provided; and
   a control unit configured to:
   determine an operator's holding state of the arms based on the signal detected by the detection units;
   control rotation of the motors for selecting a constrained state which constrains one or more of the axes by braking a corresponding one or more of the motors and a released state in which the one or more of the axes are released from being constrained, based on determined results of the hold determining unit, during the released state the operator is allowed to move the arms with the released axes for direct teaching;

determine that the operator's holding state of the arms is stopped; and control the released axes to be constrained again.

7. The articulated robot system according to claim 6, wherein the control unit is configured to control, as initial control, drive of all the plurality of motors for constraining the rotation of all the plurality of axes, before controlling the constrained state and the released state.

8. The articulated robot system according to claim 7, wherein the control unit is configured to:

determine whether or not the operator manually holds the one or more of the arms, based on the signal detected by the detection units, and control the drive of the motors for retaining the constrained state of the rotation of the plurality of axes, when the control unit performs the initial control and determines that the arms are not held.

9. The articulated robot system according to claim 7, wherein the control unit is configured to:

determine whether or not the operator manually holds a single one of the plurality of arms, based on the signal detected by the detection units, and control, among the plurality of motors, drive of all of the motors positioned between the base and the single one of the plurality of arms, such that, of the plurality of axes, all of the axes which are positioned between the base and the single one of the plurality of arms are released from being constrained in the rotation thereof, after the control unit performs the initial control and determines that the single one of the plurality of arms is manually held.

10. The articulated robot system according to claim 9, wherein the control unit is configured to determine whether or not the operator manually holds, as the single one of the plurality of arms, an arm positioned at a tip end of the plurality of arms on an end effector side thereof.

11. The articulated robot system according to claim 9, wherein the control unit is configured to:

determine whether or not the operator's manual hold of the single one of the plurality of arms determined by the control unit has ended after the control performed by the control unit, and control all the plurality of motors such that all the axes are constrained again in the rotation thereof, when the control unit determines the end of the operator's manual hold.

12. The articulated robot system according to claim 7, wherein the control unit is configured to:

determine whether or not the operator manually holds two of the plurality of arms with at least one other arm located therebetween not being manually held, based on the signal detected by the detection units, and control, among the plurality of motors, drive of all of the motors positioned at corresponding other axes of the axes positioned between the two manually held arms, such that the corresponding other axes are released from being constrained in the rotation thereof, after the control unit performs the initial control and determines that the two of the plurality of arms are held.

13. The articulated robot system according to claim 12, wherein the control unit is configured to determine whether or not the operator manually holds the two arms between which there is one arm adjacently to the two arms manually held by the operator, among the plurality of arms.

14. The articulated robot system according to claim 12, wherein the control unit is configured to determine whether or not the operator manually holds the two arms between which there are two or more arms adjacently to the two arms manually held by the operator, among the plurality of arms.

\* \* \* \* \*